United States Patent
Hassig

[19]

[11] Patent Number: 6,131,860
[45] Date of Patent: Oct. 17, 2000

[54] PNEUMATIC BOOM SYSTEM

[76] Inventor: Dave Hassig, 120 First Ave. South West, Plainview, Minn. 55964

[21] Appl. No.: 09/220,942

[22] Filed: Dec. 24, 1998

[51] Int. Cl.[7] .................................................. A62C 13/76
[52] U.S. Cl. ....................... 248/75; 137/355.16; 239/195
[58] Field of Search ................................ 248/75, 93, 91, 248/92, 81, 90, 89, 80, 276, 579, 560, 13, 123, 28, 292, 325; 137/355.16; 239/195

[56] References Cited

U.S. PATENT DOCUMENTS

| | | | |
|---|---|---|---|
| 289,835 | 12/1883 | Highfield | 408/30 |
| D. 357,557 | 4/1995 | Piper | 248/206.2 |
| 2,157,001 | 5/1939 | Morley | 248/205.5 |
| 2,296,073 | 9/1942 | Walgo | 248/205.5 |
| 2,590,006 | 3/1952 | Gordon | 248/205.5 |
| 2,783,367 | 2/1957 | Locke | 248/205.5 |
| 3,176,602 | 4/1965 | Wilt | 248/205.5 |
| 3,217,748 | 11/1965 | Harper | 137/615 |
| 3,356,102 | 12/1967 | Johnson | 137/357 |
| 3,422,827 | 1/1969 | McCulloch | 239/751 |
| 3,917,200 | 11/1975 | Johnson | 248/13 |
| 3,924,787 | 12/1975 | Gothrup | 248/206.2 |
| 4,068,867 | 1/1978 | Rodger et al. | 285/175 |
| 4,456,210 | 6/1984 | McBride | 248/205.5 |
| 4,575,005 | 3/1986 | Wiebe | 239/195 |
| 4,718,201 | 1/1988 | Legge | 51/241 |
| 4,913,390 | 4/1990 | Berke | 248/176 |
| 4,998,693 | 3/1991 | Wiebe | 248/75 |
| 5,390,837 | 2/1995 | Ruffolo, Jr. | 248/206.2 |
| 6,000,101 | 12/1999 | Tobben | 19/288 |

*Primary Examiner*—Ramon O. Ramirez
*Assistant Examiner*—Kimberly Wood

[57] ABSTRACT

A pneumatic boom system for suspending a pneumatic air hose above a ground surface so that the air hose is not in the way when not in use. The system includes an inner drum has top and bottom ends. A top disk is coupled to the top end of the inner drum and a bottom disk is coupled to the bottom end of the inner drum. The top disk defines an annular top flange extending radially outwards around the top end of the inner drum and the bottom disk defines an annular bottom flange extending radially outwards around the bottom end of the inner drum. An outer drum is disposed around the inner drum to permit free rotation of the outer drum about the inner drum. The inner drum has an exposed region defined between the top end of the inner drum and an upper end of the outer drum. The exposed region of the inner drum has an input conduit into the inner drum designed for fluidly connecting the inner drum to a supply of pressurized air. A boom is provided having proximal and distal ends, and elongate upper, lower and side beams. The side beam is coupled to the outer drum. An elongate air conduit is coupled to the lower beam of the boom. The air conduit has a first end fluidly connected to the inner drum by an outlet conduit extending from the bottom disk. A second end of the air conduit adjacent a flexible hose portion terminates at a terminal connector designed for fluid connection to a pneumatic tool.

8 Claims, 2 Drawing Sheets

PNEUMATIC BOOM SYSTEM

BACKGROUND OF THE INVENTION

1. Field of the Invention

The present invention relates to support systems for pneumatic air supplies and more particularly pertains to a new pneumatic boom system for suspending a pneumatic air hose above a ground surface so that the air hose is not in the way when not in use.

2. Description of the Prior Art

The use of support systems for pneumatic air supplies is known in the prior art. More specifically, support systems for pneumatic air supplies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,917,200; U.S. Pat. No. 4,575,005; U.S. Pat. No. 4,998,693; U.S. Pat. No. 4,068,867; U.S. Pat. No. Des. 289,835; and U.S. Pat. No. 3,217,748.

While these devices fulfill their respective, particular objectives and requirements, the aforementioned patents do not disclose a new pneumatic boom system. The inventive device includes an inner drum has top and bottom ends. A top disk is coupled to the top end of the inner drum and a bottom disk is coupled to the bottom end of the inner drum. The top disk defines an annular top flange extending radially outwards around the top end of the inner drum and the bottom disk defines an annular bottom flange extending radially outwards around the bottom end of the inner drum. An outer drum is disposed around the inner drum to permit free rotation of the outer drum about the inner drum. The inner drum has an exposed region defined between the top end of the inner drum and an upper end of the outer drum. The exposed region of the inner drum has an input conduit into the inner drum designed for fluidly connecting the inner drum to a supply of pressurized air. A boom is provided having proximal and distal ends, and elongate upper, lower and side beams. The side beam is coupled to the outer drum. An elongate air conduit is coupled to the lower beam of the boom. The air conduit has a first end fluidly connected to the inner drum by an outlet conduit extending from the bottom disk. A second end of the air conduit adjacent a flexible hose portion terminates at a terminal connector designed for fluid connection to a pneumatic tool.

In these respects, the pneumatic boom system according to the present invention substantially departs from the conventional concepts and designs of the prior art, and in so doing provides an apparatus primarily developed for the purpose of suspending a pneumatic air hose above a ground surface so that the air hose is not in the way when not in use.

SUMMARY OF THE INVENTION

In view of the foregoing disadvantages inherent in the known types of support systems for pneumatic air supplies now present in the prior art, the present invention provides a new pneumatic boom system construction wherein the same can be utilized for suspending a pneumatic air hose above a ground surface so that the air hose is not in the way when not in use.

The general purpose of the present invention, which will be described subsequently in greater detail, is to provide a new pneumatic boom system apparatus and method which has many of the advantages of the support systems for pneumatic air supplies mentioned heretofore and many novel features that result in a new pneumatic boom system which is not anticipated, rendered obvious, suggested, or even implied by any of the prior art support systems for pneumatic air supplies, either alone or in any combination thereof.

To attain this, the present invention generally comprises an inner drum has top and bottom ends. A top disk is coupled to the top end of the inner drum and a bottom disk is coupled to the bottom end of the inner drum. The top disk defines an annular top flange extending radially outwards around the top end of the inner drum and the bottom disk defines an annular bottom flange extending radially outwards around the bottom end of the inner drum. An outer drum is disposed around the inner drum to permit free rotation of the outer drum about the inner drum. The inner drum has an exposed region defined between the top end of the inner drum and an upper end of the outer drum. The exposed region of the inner drum has an input conduit into the inner drum designed for fluidly connecting the inner drum to a supply of pressurized air. A boom is provided having proximal and distal ends, and elongate upper, lower and side beams. The side beam is coupled to the outer drum. An elongate air conduit is coupled to the lower beam of the boom. The air conduit has a first end fluidly connected to the inner drum by an outlet conduit extending from the bottom disk. A second end of the air conduit adjacent a flexible hose portion terminates at a terminal connector designed for fluid connection to a pneumatic tool.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pneumatic boom system apparatus and method which has many of the advantages of the support systems for pneumatic air supplies mentioned heretofore and many novel features that result in a new pneumatic boom system which is not anticipated, rendered obvious, suggested, or even implied by any of the prior art support systems for pneumatic air supplies, either alone or in any combination thereof.

It is another object of the present invention to provide a new pneumatic boom system which may be easily and efficiently manufactured and marketed.

It is a further object of the present invention to provide a new pneumatic boom system which is of a durable and reliable construction.

An even further object of the present invention is to provide a new pneumatic boom system which is susceptible of a low cost of manufacture with regard to both materials and labor, and which accordingly is then susceptible of low prices of sale to the consuming public, thereby making such pneumatic boom system economically available to the buying public.

Still yet another object of the present invention is to provide a new pneumatic boom system which provides in the apparatuses and methods of the prior art some of the advantages thereof, while simultaneously overcoming some of the disadvantages normally associated therewith.

Still another object of the present invention is to provide a new pneumatic boom system for suspending a pneumatic air hose above a ground surface so that the air hose is not in the way when not in use.

Yet another object of the present invention is to provide a new pneumatic boom system which includes an inner drum has top and bottom ends. A top disk is coupled to the top end of the inner drum and a bottom disk is coupled to the bottom end of the inner drum. The top disk defines an annular top flange extending radially outwards around the top end of the inner drum and the bottom disk defines an annular bottom flange extending radially outwards around the bottom end of the inner drum. An outer drum is disposed around the inner drum to permit free rotation of the outer drum about the inner drum. The inner drum has an exposed region defined between the top end of the inner drum and an upper end of the outer drum. The exposed region of the inner drum has an input conduit into the inner drum designed for fluidly connecting the inner drum to a supply of pressurized air. A boom is provided having proximal and distal ends, and elongate upper, lower and side beams. The side beam is coupled to the outer drum. An elongate air conduit is coupled to the lower beam of the boom. The air conduit has a first end fluidly connected to the inner drum by an outlet conduit extending from the bottom disk. A second end of the air conduit adjacent a flexible hose portion terminates at a terminal connector designed for fluid connection to a pneumatic tool.

Still yet another object of the present invention is to provide a new pneumatic boom system that will keep the air hose close by a user so that the user may have easy access to the air hose when needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
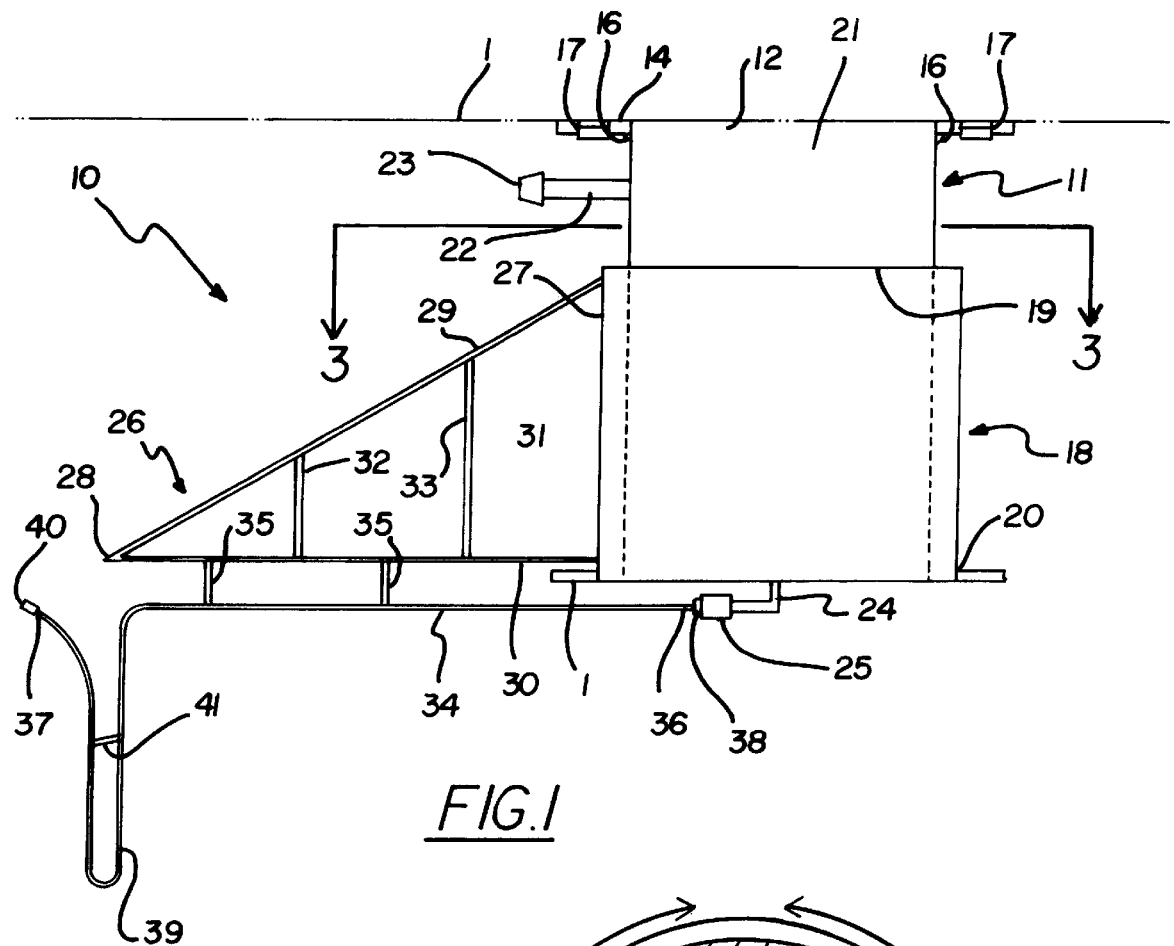
FIG. 1 is a schematic side view of a new pneumatic boom system according the present invention.
Figure 3:
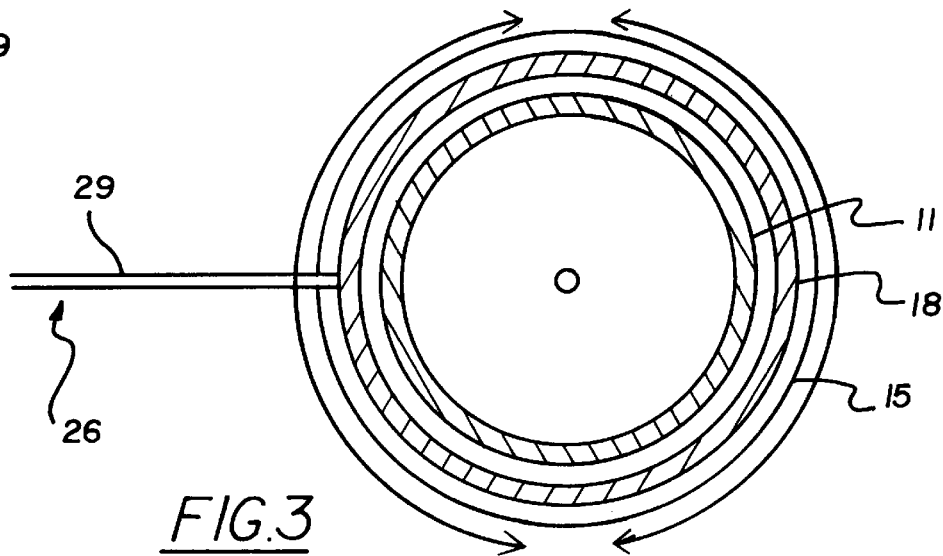
FIG. 3 is a schematic cross sectional view of the present invention taken from line 3—3 of FIG. 2.
Figure 2:
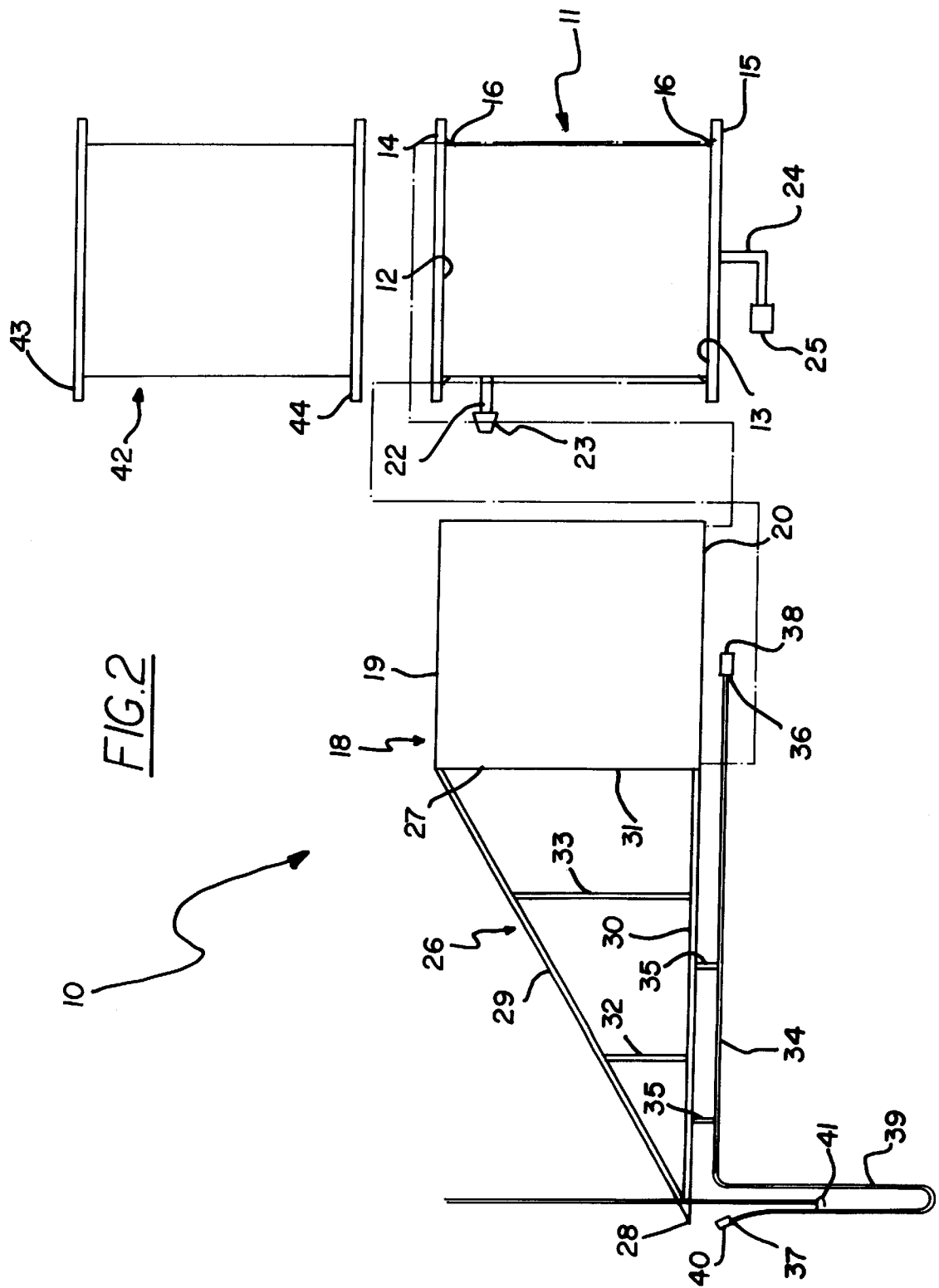
FIG. 2 is a schematic exploded side view of the present invention.

With reference now to the drawings, and in particular to FIGS. 1 through 3 thereof, a new pneumatic boom system embodying the principles and concepts of the present invention and generally designated by the reference numeral 10 will be described.

As best illustrated in FIGS. 1 through 3, the pneumatic boom system 10 generally comprises an inner drum 11 has top and bottom ends 12,13. A top disk 14 is coupled to the top end 12 of the inner drum 11 and a bottom disk 15 is coupled to the bottom end 13 of the inner drum 11. The top disk 14 defines an annular top flange extending radially outwards around the top end 12 of the inner drum 11 and the bottom disk 15 defines an annular bottom flange extending radially outwards around the bottom end 13 of the inner drum 11. An outer drum 18 is disposed around the inner drum 11 to permit free rotation of the outer drum 18 about the inner drum 11. The inner drum 11 has an exposed region 21 defined between the top end 12 of the inner drum 11 and an upper end 19 of the outer drum 18. The exposed region 21 of the inner drum 11 has an input conduit 22 into the inner drum 11 designed for fluidly connecting the inner drum 11 to a supply of pressurized air. A boom 26 is provided having proximal and distal ends 27,28, and elongate upper, lower and side beams 29,30,31. The side beam 31 is coupled to the outer drum 18. An elongate air conduit 34 is coupled to the lower beam 30 of the boom 26. The air conduit 34 has a first end 36 fluidly connected to the inner drum 11 by an outlet conduit 24 extending from the bottom disk 15. A second end 37 of the air conduit 34 adjacent a flexible hose portion 39 terminates at a terminal connector designed for fluid connection to a pneumatic tool.

In closer detail, the generally cylindrical inner drum 11 has generally circular open top and bottom ends 12,13, and an vertically extending axis extending between the top and bottom ends 12,13. The inner drum 11 has a diameter defined transverse the axis of the inner drum 11 and a length defined between the top and bottom ends 12,13 of the inner drum 11. Ideally, the diameter of the inner drum 11 is about 3 inches. Generally planar top and bottom disks 14,15 are attached to the inner drum and each have a center and a diameter. The top disk 14 is coupled to the top end 12 of the inner drum 11 to close the top end 12 of the inner drum 11. The bottom disk 15 is coupled to the bottom end 13 of the inner drum 11 to close the bottom end 13 of the inner drum 11. Ideally, the top and bottom disks 14,15 are welded to the respective ends of the inner drum 11 with annular welds 16 to form a substantially air-tight seal between each disk and the respective end of the inner drum 11. In use, the inner drum 11 should be designed for holding pressurized air therein. The top and bottom disks 14,15 generally lie in generally parallel horizontal planes. The centers of the top and bottom disks 14,15 are preferably generally coaxial with the axis of the inner drum 11.

The diameters of the top and bottom disks 14,15 each are greater than the diameter of the inner drum 11 and preferably, the diameters of the top and bottom disks 14,15 are about equal to one another. The top disk 14 defines an annular top flange extending radially outwards around the top end 12 of the inner drum 11 and he bottom disk 15 defines an annular bottom flange extending radially outwards around the bottom end 13 of the inner drum 11. In use, the top flange is designed for mounting to an overhead support structure 1 such that the inner drum 11 depends from the support structure 1. Preferably, the top flange is designed for extending fasteners 17 therethrough such as mounting bolts for mounting the top flange to a support structure 1.

Optionally, as illustrated in FIG. 2, an extension drum 42 may be provided for mounting the inner drum to high ceilings. The extension drum has upper and lower flanges 43,44 and preferably has roughly the same dimensions as the inner drum 11. In this embodiment, the top flange of the top disk 14 is coupled to the lower flange 43 of the extension drum while the upper flange 43 of the extension drum is mounted to the ceiling 1.

The generally cylindrical outer drum 18 has generally circular open upper and lower ends 19,20, and an vertically extending axis extending between the upper and lower ends 19,20 of the outer drum 18. The outer drum 18 has a diameter defined transverse the axis of the outer drum 18 and a length defined between the upper and lower ends 19,20 of the outer drum 18. The diameter of the outer drum 18 is greater than the diameter of the inner drum 11. The outer drum 18 is disposed around the inner drum 11 such that the inner drum 11 extends through the outer drum 18 and permits free rotation of the outer drum 18 about the axis of the inner drum 11. Ideally, the axes of the inner and outer drum 18 are generally coaxial. The outer drum 18 is positioned between the top and bottom flanges with the lower end 20 of the outer drum 18 resting on the bottom flange. The length of the inner drum 11 is greater than the length of the outer drum 18 so that the top end 12 of the inner drum 11 extends above the upper end 19 of the outer drum 18.

The inner drum 11 has an exposed region 21 defined between the top end 12 of the inner drum 11 and the upper end 19 of the outer drum 18. The exposed region 21 of the inner drum 11 has an input conduit 22 into the inner drum 11, the input conduit 22 has a connector 23 outwardly extending from the inner drum 11 designed for fluidly connecting the input conduit 22 to a supply of pressurized air so that pressurized air may pass into the inner drum 11. Ideally, the connector 23 of the exposed region 21 comprises a male quick-disconnector.

The bottom disk 15 has a hole through which an L-shaped outlet conduit 24 extends into the inner drum 11. The outlet conduit 24 is preferably positioned at the center of the bottom disk 15. The outlet conduit 24 is rotatably mounted to the bottom disk 15 to permit rotation of the outlet conduit 24 in a horizontal plane generally parallel to the plane of the bottom disk 15. The outlet conduit 24 is designed for permitting passage of pressurized air out of the inner drum 11. The outlet conduit 24 has a connector 25 downwardly extending from the bottom disk 15. Ideally, the connector 25 of the outlet conduit 24 comprises a male quick-disconnector.

The boom 26 is generally triangular in configuration and has proximal and distal ends 27,28, and elongate upper, lower and side beams 29,30,31. The upper and lower beams 29,30 extend between the distal and proximal ends 28,27 of the boom 26 and are coupled together at the distal end 28 of the boom 26. The side beam 31 is located at the proximal end 27 of the boom 26 and extends between the upper and lower beams 29,30. The side beam 31 is coupled to the outer drum 18 and is positioned between the upper and lower ends 19,20 of the outer drum 18. Each of the beams has a longitudinal axis. The longitudinal axis of the side beam 31 is extended generally vertical so that the longitudinal axis of the side beam 31 extends generally parallel to the axis of the outer drum 18. The longitudinal axis of the lower beam 30 is extended generally horizontally perpendicular to the longitudinal axis of the side beam 31. The longitudinal axis of the upper beam 29 is extended at an acute angle with respect to the longitudinal axis of the lower beam 30. Preferably, the acute angle between the upper and lower beams 29,30 is between about 10 degrees and about 45 degrees.

Preferably, the boom 26 has a spaced apart pair of elongate vertical cross beams 32,33 located between the proximal and distal ends 27,28 of the boom 26 and extending between the upper and lower beams 29,30. The cross beams 32,33 each have a longitudinal axis extending generally parallel to the longitudinal axis of the side beam 31. The cross beams 32,33 is designed for providing additional structural strength to the boom 26.

Preferably, the longitudinal axes of the beams of the boom 26 generally lie in a common plane. Ideally, the axis of the outer drum 18 generally lies in the common plane of the beams of the boom 26.

The elongate air conduit 34 is suspended from the lower beam 30 of the boom 26 by a plurality of brackets 35. The air conduit 34 has opposite first and second ends 36,37. The first end 36 of the air conduit 34 is located adjacent the proximal end 27 of the boom 26. The first end 36 of the air conduit 34 has a connector 38 which ideally comprises a female quick-disconnector. The connector 38 of the first end 36 of the air conduit 34 is matingly coupled to the connector 25 of the outlet conduit 24 to fluidly connect the air conduit 34 to the outlet conduit 24 to permit passage of pressurized air out of the inner drum 11 and into the air conduit 34 via the outlet conduit 24.

The air conduit 34 has an elongate flexible hose portion 39 adjacent the second end 37 of the air conduit 34. The flexible hose portion 39 downwardly depends from the distal end 28 of the boom 26. The second end 37 of the air conduit 34 terminates at a terminal connector 40 designed for fluid connection to a pneumatic tool. Ideally, the terminal connector 40 of the flexible hose portion 39 comprises a female quick-disconnect. Preferably, as illustrated in FIG. 1, the second end 37 of the air conduit 34 has a hook 41 designed for hooking on to a middle region of the flexible hose portion 39 such that the second end 37 of the air conduit 34 extends in a upwards direction ideal for holding the second end 37 up when not in use so that it does not drag on the ground and is easily locatable by a user when needed.

In use, the system 10 provides a means for supporting a the hose of a pneumatic air supply above the ground. The boom can be swiveled around the inner drum to position the second end of the air conduit to any desired location in a 360 degree arc around the inner drum.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A support system for a pneumatic air supply, comprising:

an inner drum having open top and bottom ends, and an axis extending between said top and bottom ends;

said inner drum having a diameter defined transverse said axis of said inner drum and a length defined between said top and bottom ends of said inner drum;

top and bottom disks each having a center and a diameter;

said top disk being coupled to said top end of said inner drum to close said top end of said inner drum, said bottom disk being coupled to said bottom end of said inner drum to close said bottom end of said inner drum;

said diameters of said top and bottom disks each being greater than said diameter of said inner drum;

said top disk defining an annular top flange extending radially outwards around said top end of said inner drum;

said bottom disk defining an annular bottom flange extending radially outwards around said bottom end of said inner drum;

said top flange being adapted for mounting to a support structure such that said inner drum depends from said support structure;

an outer drum having open upper and lower ends, and an axis extending between said upper and lower ends of said outer drum;

said outer drum having a diameter defined transverse said axis of said outer drum and a length defined between said upper and lower ends of said outer drum, said diameter of said outer drum being greater than said diameter of said inner drum;

said outer drum being disposed around said inner drum to permit free rotation of said outer drum about said axis of said inner drum;

said lower end of said outer drum being rested on said bottom flange;

said length of said inner drum being greater than said length of said outer drum so that said top end of said inner drum extends above said upper end of said outer drum;

said inner drum having an exposed region defined between said top end of said inner drum and said upper end of said outer drum;

said exposed region of said inner drum having an input conduit into said inner drum adapted for fluidly connecting said inner drum to a supply of pressurized air;

a boom having proximal and distal ends, and elongate upper, lower and side beams;

said upper and lower beams extending between said distal and proximal ends of said boom and being coupled together at said distal end of said boom, said side beam being located at said proximal end of said boom and extending between said upper and lower beams;

said side beam being coupled to said outer drum;

an elongate air conduit being coupled to said lower beam of said boom;

said air conduit having opposite first and second ends;

said first end of said air conduit being located adjacent said proximal end of said boom;

said bottom disk having an outlet conduit into said inner drum fluidly connecting said first end of said air conduit to said inner drum;

said air conduit having an elongate flexible hose portion adjacent said second end of said air conduit, said flexible hose portion downwardly depending from said distal end of said boom; and said second end of said air conduit terminating at a terminal connector adapted for fluid connection to a pneumatic tool.

2. The support system of claim 1, wherein said top and bottom disks are welded to the respective ends of said inner drum to form a substantially air-tight seal between each disk and the respective end of said inner drum.

3. The support system of claim 1, wherein said top and bottom disks generally lie in generally parallel planes and said centers of said top and bottom disks are generally coaxial with said axis of said inner drum.

4. The support system of claim 1, wherein said diameters of said top and bottom disks are about equal to one another.

5. The support system of claim 1, wherein said top flange is adapted for extending fasteners therethrough for mounting said top flange to a support structure.

6. The support system of claim 1, wherein said axes of said inner and outer drum are generally coaxial.

7. The support system of claim 1, wherein said boom has a spaced apart pair of elongate cross beams located between said proximal and distal ends of said boom and extending between said upper and lower beams.

8. A support system for a pneumatic air supply, comprising:

a generally cylindrical inner drum having generally circular open top and bottom ends, and an axis extending between said top and bottom ends;

said inner drum having a diameter defined transverse said axis of said inner drum and a length defined between said top and bottom ends of said inner drum;

generally planar top and bottom disks each having a center and a diameter;

said top disk being coupled to said top end of said inner drum to close said top end of said inner drum, said bottom disk being coupled to said bottom end of said inner drum to close said bottom end of said inner drum;

wherein said top and bottom disks are welded to the respective ends of said inner drum to form a substantially air-tight seal between each disk and the respective end of said inner drum;

said top and bottom disks generally lying in generally parallel planes;

said centers of said top and bottom disks being generally coaxial with said axis of said inner drum;

said diameters of said top and bottom disks each being greater than said diameter of said inner drum, wherein said diameters of said top and bottom disks are about equal to one another;

said top disk defining an annular top flange extending radially outwards around said top end of said inner drum;

said bottom disk defining an annular bottom flange extending radially outwards around said bottom end of said inner drum;

said top flange being adapted for mounting to a support structure such that said inner drum depends from said support structure;

wherein said top flange is adapted for extending fasteners therethrough for mounting said top flange to a support structure;

a generally cylindrical outer drum having generally circular open upper and lower ends, and an axis extending between said upper and lower ends of said outer drum;

said outer drum having a diameter defined transverse said axis of said outer drum and a length defined between said upper and lower ends of said outer drum, said diameter of said outer drum being greater than said diameter of said inner drum;

said outer drum being disposed around said inner drum such that said inner drum extends through said outer drum and to permit free rotation of said outer drum about said axis of said inner drum, said axes of said inner and outer drum being generally coaxial;

said outer drum being positioned between said top and bottom flanges, said lower end of said outer drum being rested on said bottom flange;

said length of said inner drum being greater than said length of said outer drum so that said top end of said inner drum extends above said upper end of said outer drum;

said inner drum having an exposed region defined between said top end of said inner drum and said upper end of said outer drum;

said exposed region of said inner drum having an input conduit into said inner drum, said input conduit having a connector outwardly extending from said inner drum adapted for fluidly connecting said input conduit to a supply of pressurized air so that pressurized air may pass into said inner drum;

wherein said connector of said exposed region comprises a male quick-disconnector;

said bottom disk having an L-shaped outlet conduit into said inner drum, said outlet conduit being positioned at said center of said bottom disk, said outlet conduit being rotatably mounted to said bottom disk to permit rotation of said outlet conduit in a plane generally parallel to said plane of said bottom disk;

said outlet conduit having a connector downwardly extending from said bottom disk, wherein said connector of said outlet conduit comprises a male quick-disconnector;

a boom being generally triangular in configuration and having proximal and distal ends, and elongate upper, lower and side beams;

said upper and lower beams extending between said distal and proximal ends of said boom and being coupled together at said distal end of said boom, said side beam being located at said proximal end of said boom and extending between said upper and lower beams;

said side beam being coupled to said outer drum and being positioned between said upper and lower ends of said outer drum;

each of said beams having a longitudinal axis;

said longitudinal axis of said side beam being extended generally parallel to said axis of said outer drum;

said longitudinal axis of said lower beam being extended generally perpendicular to said longitudinal axis of said side beam;

said longitudinal axis of said upper beam being extended at an acute angle with respect to said longitudinal axis of said lower beam, wherein said acute angle between said upper and lower beams is between about 10 degrees and about 45 degrees;

said boom having a spaced apart pair of elongate cross beams located between said proximal and distal ends of said boom and extending between said upper and lower beams, said cross beams each having a longitudinal axis extending generally parallel to said longitudinal axis of said side beam;

said longitudinal axes of said beams of said boom generally lying in a common plane, said axis of said outer drum generally lying in said common plane of said beams of said boom;

an elongate air conduit being coupled to said lower beam of said boom;

said air conduit having opposite first and second ends;

said first end of said air conduit being located adjacent said proximal end of said boom, said first end of said air conduit having a connector, wherein said connector of said first end of said air conduit comprises a female quick-disconnector;

said connector of said first end of said air conduit being coupled to said connector of said outlet conduit to fluidly connect said air conduit to said outlet conduit;

said air conduit having an elongate flexible hose portion adjacent said second end of said air conduit, said flexible hose portion downwardly depending from said distal end of said boom;

said second end of said air conduit terminating at a terminal connector adapted for fluid connection to a pneumatic tool, wherein said terminal connector of said flexible hose portion comprises a female quick-disconnect; and said second end of said air conduit having a hook adapted for hooking on to a middle region of said flexible hose portion such that said second end of said air conduit extends in a upwards direction.

* * * * *